US012616630B2

(12) United States Patent
Tiguert

(10) Patent No.: US 12,616,630 B2
(45) Date of Patent: May 5, 2026

(54) SCAR SKIN MASSAGE DEVICE

(71) Applicant: DREAMER, Paris (FR)

(72) Inventor: Elenita L. Tiguert, Paris (FR)

(73) Assignee: DREAMER, Paris (FR)

(*) Notice: Subject to any disclaimer, the term of this patent is extended or adjusted under 35 U.S.C. 154(b) by 545 days.

(21) Appl. No.: 18/252,757

(22) PCT Filed: Nov. 10, 2021

(86) PCT No.: PCT/FR2021/051999
§ 371 (c)(1),
(2) Date: May 12, 2023

(87) PCT Pub. No.: WO2022/101585
PCT Pub. Date: May 19, 2022

(65) Prior Publication Data
US 2024/0000655 A1 Jan. 4, 2024

(30) Foreign Application Priority Data
Nov. 12, 2020 (FR) ....................................... 2011624

(51) Int. Cl.
*A61H 19/00* (2006.01)
*A61H 9/00* (2006.01)
*A61H 23/02* (2006.01)

(52) U.S. Cl.
CPC ........... *A61H 19/32* (2013.01); *A61H 9/0057* (2013.01); *A61H 23/0254* (2013.01); *A61H 2201/0188* (2013.01); *A61H 2201/165* (2013.01); *A61H 2201/5002* (2013.01); *A61H 2201/5005* (2013.01); *A61H 2201/501* (2013.01)

(58) Field of Classification Search
CPC ........ A61H 19/00–34; A61H 7/00–001; A61H 7/007–008; A61H 9/00–0007; A61H 9/005–0057; A61H 23/00; A61H 23/02; A61H 23/0245; A61H 23/0254–0263; A61H 23/04; A61H 2023/0209; A61H 2023/0272–029; A61H 2201/165; A61H 2201/5002; A61H 2201/5005; A61H 2201/5056; A61H 2201/501; A61H 2205/082; A61M 1/06–08
See application file for complete search history.

(56) References Cited

U.S. PATENT DOCUMENTS

| | | | |
|---|---|---|---|
| 2015/0141880 | A1 | 5/2015 | Ehrenreich |
| 2017/0252261 | A1 | 9/2017 | Khorassani Zadeh |
| 2020/0188221 | A1 | 6/2020 | Lenke |

OTHER PUBLICATIONS

International Search Report issued on Feb. 14, 2022, in corresponding International Application No. PCT/FR2021/051999, 7 pages.

*Primary Examiner* — Rachel T Sippel
(74) *Attorney, Agent, or Firm* — Maier & Maier, PLLC

(57) ABSTRACT

A skin massage device for positioning in contact with the skin of a person. It includes a positioning membrane configured to delimit a zone of action and generate a sealed contact, a main suction device, a vibrator ring configured to produce a series of vibrations according to a pre-established pattern. The vibrator ring is removably and sealingly attached between the positioning diaphragm and the main suction device, such that the device is generally rotationally symmetrical about an axis A. The device forms a decompression cone which, when switched on, simultaneously generates a suction and a series of vibrations at the action area.

10 Claims, 4 Drawing Sheets

SCAR SKIN MASSAGE DEVICE

FIELD

The present invention relates to a device for softening post-operative scar tissue and a method for stretching such scar tissue.

BACKGROUND

In France, it is estimated that between 49,000 and 58,000 breast cancers are diagnosed every year and that the number is increasing by an average of 1.1% per year. In about 30 to 40% of cases, women (or other people with breast cancer) have a mastectomy, i.e. the total or partial removal of one or more breasts. This is a major surgical procedure that can be both physically and psychologically painful.

After a mastectomy, breast reconstruction is available. Breast reconstruction is usually an integral part of breast cancer management, particularly after non-conservative breast surgery such as mastectomy. Breast reconstruction can be immediate, i.e. performed at the same time as the mastectomy, or delayed, i.e. performed again some time later.

As is well known from the state of the art, breast reconstruction takes place in three stages: reconstruction of the breast volume, harmonisation of the two breasts, and creation of the areola and nipple area. There are currently three different forms of breast reconstruction:

- Implant reconstruction: during surgery, a breast prosthesis is placed under the woman's pectoral muscle.
- Flap reconstruction: during surgery, muscle (and fat) tissue from another part of the body is used as a graft.
- Reconstruction by injection: during surgery, fatty tissue is injected into the breast to be reconstructed.

Implant reconstruction presents significant risks of post-operative complications, such as implant rejection, peri-prosthetic shell phenomenon or various retractions. These complications cause a lot of pain and in some cases can be infectious in themselves. In very rare cases, patients with major post-operative complications may even develop cancer of the lymphatic system (Large Cell Anaplastic Lymphoma associated with the breast implant or LAGC-AIM).

Flap reconstruction, on the other hand, requires seven to eight hours of surgery under general anaesthesia, performed in microsurgery by highly specialised surgeons. In addition to the risks associated with a general anaesthetic, the waiting time for such an operation is therefore long. In addition, this type of reconstruction has a risk of failure ranging from 2 to 4%, i.e. the vessels have a significant risk of becoming blocked and leading to necrosis of the grafted flesh.

Reconstruction with injections has a low risk of post-operative complications as it is a relatively non-invasive surgical procedure, quite similar to non-invasive cosmetic treatments. However, the mastectomy leaves scar tissue with a high degree of rigidity. This scar tissue does not stretch well and it can therefore be difficult to inject fatty tissue under the rigid (and therefore very unstretchable) skin of this traumatised area. This rigidity can even prevent reconstruction by injection, even though this presents the least risk of post-operative complications and is very non-invasive.

In view of all the risks, disadvantages and limitations outlined above, only two out of ten women have breast reconstruction.

One of the objectives of the present invention is to enable any woman (or other person) who so desires to have breast reconstruction following a mastectomy.

The present invention thus offers a solution to combat the scar rigidity induced by mastectomy, thereby increasing the possibilities of using injection breast reconstruction, which is less invasive and less dangerous than other currently proposed methods.

SUMMARY

This is achieved in accordance with the invention by a skin massage device configured to be positioned in contact with a person's skin, the device comprising:

- a positioning membrane configured to
  - delimit an action area of the device, and
  - generate a sealed contact between said action area of the device,
- a main suction device controlled by an operating element,
- a vibrator ring configured to produce a series of vibrations according to a pre-set pattern, the vibrator ring also being controlled by the operating element,
- the positioning membrane, the main suction device and the vibrator ring each presenting a rotational symmetry according to an axis A,
- the vibrator ring being secured in a detachable and sealed way between the positioning membrane and the main suction device, so that the device presents a general rotational symmetry around the axis A, The invention is characterised in that the device forms a decompression cone which, when switched on, simultaneously generates a suction and a series of vibrations in the action area.

This solution achieves the above-mentioned objective. In particular, the suction of the skin allows it to be stretched outwards, creating a pocket that can accommodate fatty tissues. The combination of suction with vibrations allows an improvement of the blood circulation and thus restores flexibility and elasticity to the traumatised skin in addition to creating the pocket.

The skin massage device according to the invention may comprise one or more of the following features, taken alone from each other or in combination with each other:

- the device comprises at least one red electroluminescent diode configured to illuminate the action area,
- the operating element is an app intended for being installed on a mobile phone,
- the device comprises an auxiliary suction device, which is detachably connected to the main suction device by a fluidic line,
- each suction device displays three different suction forces,
- each suction device has a low suction force comprised between 90 and 100 mmHg, a medium suction force comprised between 160 and 170 mmHg, and a high suction force comprised between 240 and 250 mmH,
- each suction device has a discontinuous functioning, producing a series of 40 to 60 suctions per minute,
- the vibrator ring is configured to receive a motherboard for recording the pre-set vibration pattern,
- the vibrator ring comprises at least one vibration spot, each vibration spot generating 40 to 50 vibrations per second.

The invention has also for object a skin stretching method, using the device as described here-above, characterised in that it comprises, in the following order, the following steps:

- positioning the device assembled in a sealed manner along the axis A against the skin of an action area of a user,
- switching on the device, programming and storing, by the user, of a vibration pattern in the motherboard by means of the operating element, or selection by the user of a vibration pattern pre-stored in the motherboard, suction of the action area by a suction device and simultaneously vibrating the action zone by the vibrator ring according to:

either a defined number of cycles, or an indeterminate duration left to the discretion of the user, each suction generating a suction movement of the action zone towards the interior of the device so as to stretch it, each vibration generating the propagation of movement waves in the action zone, so as to stimulate it metabolically, the method making it possible to observe, after several uses of the device:

a gain in elasticity and flexibility of the action zone, an enlargement of the action zone by stretching it, so as to create a pocket suitable, for example, for receiving a graft or an implant.

DESCRIPTION OF THE FIGURES

The invention will be better understood, and other purposes, details, features and advantages thereof will become clearer on reading the following detailed explanatory description of embodiments of the invention given by way of purely illustrative and non-limiting examples, with reference to the attached drawings.

DETAILED DESCRIPTION

In the first part, the parts making up the skin massage device 10 will be described. Its operation will be detailed in a second part.

DESCRIPTION OF THE PARTS

Figure 1:
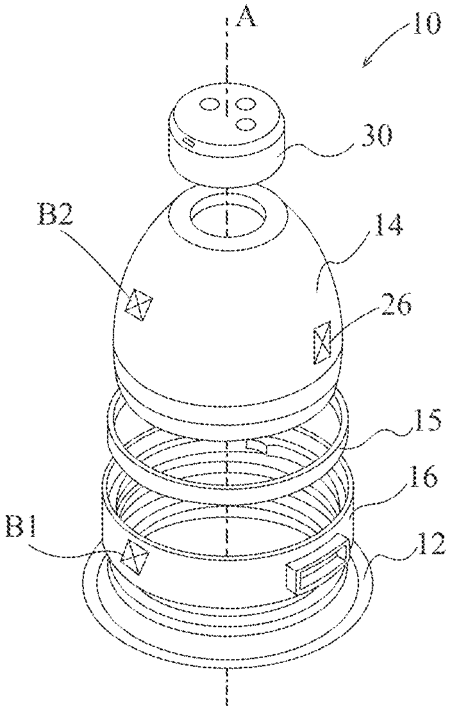
FIG. 1 is an exploded perspective view of an embodiment of the invention.

FIG. 1 shows that the skin massage device 10 according to the invention, has three main elements designed to fit together along an axis A:

a positioning membrane 12, a main suction device 14, and a vibrator ring 16.

The positioning membrane 12, the main suction device 14 and the vibrator ring 16 are each rotationally symmetrical with regards to the axis A, and when these three elements are fitted together along the axis A, the vibrator ring 16 is attached in a detachable and sealed way between the positioning membrane 12 and the main suction device 14. Thus, once assembled, the device 10 presents a general rotational symmetry around the axis A. In the embodiment illustrated in FIG. 1, the assembled device 10 has a generally conical shape.

The advantages of having a device 10 with several parts to be assembled allow the materials in which these parts are made to be alternated. This also makes it possible to change one of the parts without changing the others if they are still functional. Furthermore, as each woman (and even each person in general) has different and personal morphologies, the fact that it is the result of an assembly of several parts allows the device 10 to be modular and adaptable to each of these morphologies. The different parts thus present a variety of dimensions based on the usual dimensions of the cup sizes of lingerie articles. More particularly, the membrane 12 is thus detachable from the main suction device 14, which makes it possible to change it regularly, for example between two users or between two uses by the same user, allowing good disinfection.

Figure 2A:
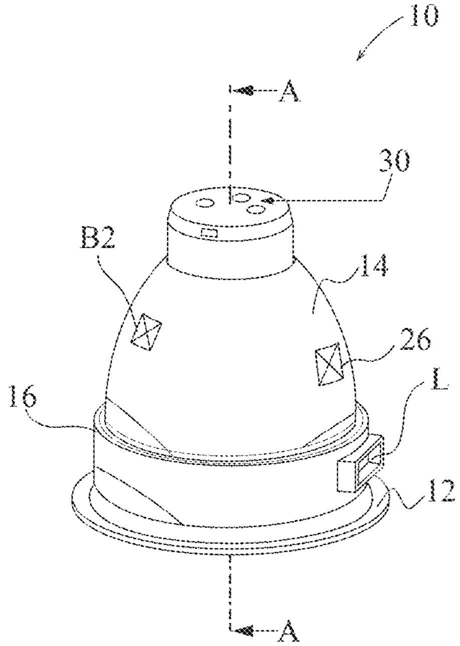
FIG. 2*a* is an assembled and perspective view of the embodiment of FIG. 1.
Figure 2B:
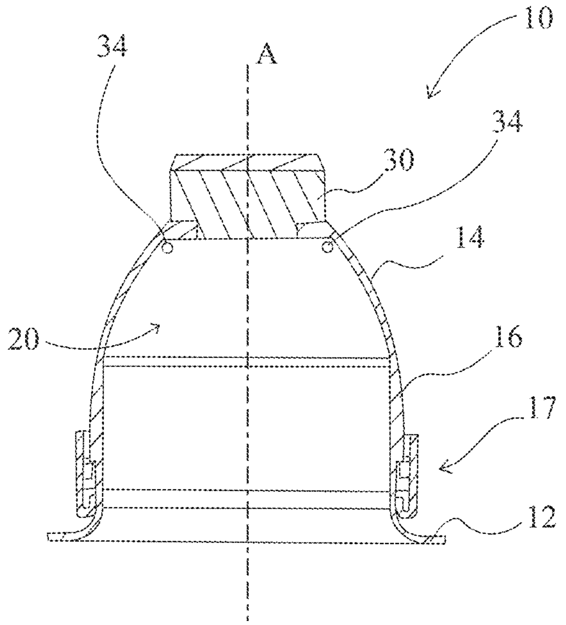
FIG. 2*b* is a longitudinal sectional view of the view in FIG. 2*a*.

The sealing between the different elements to be fitted together is ensured, for example as illustrated in FIG. 1, by means of annular seals 15 which are inserted between the parts to be fitted together. This sealing can also be ensured by annular snap mechanisms 17 as shown in FIG. 2*b*, between the vibrator ring 16 and the main suction device 14.

The ring seal 15 also serves to dampen the vibrations of the vibrator ring 16 around the suction device 14. The annular seal 15 also serves to dampen the noise of the vibrator ring 16.

Figure 5:
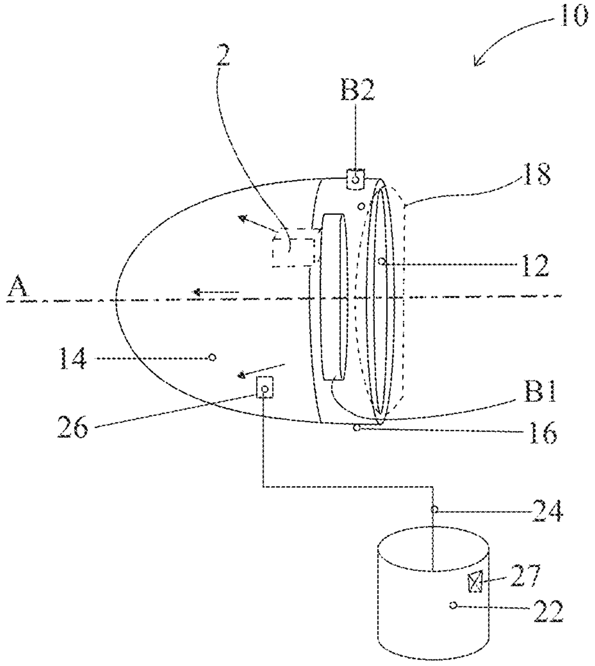
FIG. 5 is a general block diagram of the device according to the invention.

The device 10 can be operated by means of either:

a rechargeable battery B1 (see FIGS. 1 and 2*a*), a mains connection means B2 (see FIG. 5).

The rechargeable battery B1 (shown in FIG. 5) is preferably a lithium battery that can be recharged via a USB interface. The battery B1 may be removable. The battery B1 once recharged allows the device 10 to be operated between 2 and 5 hours. Alternatively, the device 10 may be operated by plugging it into the mains, for example when not travelling for a long period. The device 10 may comprise only a battery B1, only a mains connection means B2 or both.

The positioning membrane 12 is configured to delimit an action area 18 of the device 10 on the user's skin, the action area 18 having been carefully selected, and generate and ensure a tight contact between said action area 18 and the device 10 throughout the use of the device 10.

It is important to be able to precisely delimit an action area 18 of the device 10 on the skin of a user because the action of the device 10 must be targeted. Indeed, if the action of the device 10 is not targeted, the effect would be less and above all, in the idea of reconstructing a breast, it is very important that this is reconstructed in a place precisely decided and chosen by the user. The precision of the action of the device 10 is therefore essential to the success of the breast reconstruction made possible by the device 10. This is all the more important as the device 10 is intended to be used several times on the same action area 18, so it is essential that this action area 18 can be targeted as many times as necessary with precision and reliability by any user.

It is also essential, for the proper functioning of the device 10, to ensure a complete seal both between the interlocking parts as seen above, and between the device 10 and the user's skin.

In the embodiment illustrated in FIGS. 1 to 4*b*, the positioning membrane 12 has an annular shape. In other embodiments, this positioning membrane 12 may have a solid disc shape, as for example illustrated in FIG. 5. This positioning membrane 12 is made of biodegradable hypoallergenic silicone. The positioning membrane 12 is a flexible element that can be deformed. The positioning membrane 12 can thus be easily deformed under the action of the vibrator ring 16, for example. This flexibility also allows it to perfectly follow the curves of the user and thus, to favour the sealing around the action zone 18. The positioning membrane 12 is a passive element.

The main suction device 14 is made of a rigid material to ensure a good grip and to optimise suction. The main suction device 14 is configured to draw in ambient air. It is hollow, as seen in FIG. 2*b*, thus forming a decompression chamber 20. This chamber may have a constant or variable radius and may be very thin or very wide from one embodiment to another. At a constant suction force, the wider the decompression chamber 20, the greater the effect of the main suction device 14. However, the main suction device 14 must maintain a sufficient wall thickness to withstand the effect of the suction without deforming.

In the embodiment illustrated in FIG. 5, the device 10 furthermore comprises an auxiliary suction device 22, which is detachably connected to the main suction device 14 via a fluid line 24.

Regardless of the number of suction devices 14, 22, each suction device 14, 22 has three different suction forces:

- a low suction force comprised between 90 and 100 mmHg,
- a medium suction force comprised between 160 and 170 mmHg, and
- a high suction force comprised between 240 and 250 mmHg.

At the beginning of the treatment, when the device 10 is used for the first time, when the skin (scar tissue) of the action area 18 is still very rigid and fragile, the use of a low suction force allows the user's skin to be spared. As the health of the skin (scar tissue) in the action area 18 improves, the skin has a near-normal elasticity and the suction force can be increased without causing damage.

Each suction generates a vacuum in the decompression chamber 20.

Each suction device 14, 22 may be operated in continuous functioning (operation) or, depending on the embodiment, in discontinuous functioning (operation). In this case, each suction device 14, 22 produces a series of 40 to 60 suctions per minute, each time generating a vacuum in the decompression chamber 20. Between two vacuums, the pressure in the decompression chamber 20 rises. This rise is either active i.e., each suction device 14, 22 can also inject air into the decompression chamber 20, or passive i.e., the pressure in the decompression chamber 20 returns to ambient pressure simply by means of a release valve 26.

In some embodiments, this release valve 26 may also serve to connect the auxiliary suction device 22 to the main suction device 14. In this case, the auxiliary suction device 22 itself has an auxiliary release valve 27 which serves the same purpose.

The vibrator ring 16 is configured to produce a series of vibrations in accordance with a predetermined pattern.

The vibrator ring 16 may be configured to receive a motherboard for recording the pre-set pattern of vibrations. In the embodiment shown in FIGS. 2*a* and 3, the vibrator ring 16 is provided with a housing L for receiving the motherboard and the rechargeable battery B1. In the illustrated embodiment, the housing L has a height of 8 mm and a length of 26 mm.

Due to its annular shape and the tight fit of the various parts of the device 10 along the axis A, the vibrator ring 16 extends the decompression chamber 20 defined by the main suction device 14. It thus makes it possible to propagate the negative pressure generated by the main suction device 14 (or the auxiliary suction device 22, if necessary) to the positioning membrane 12 (or directly to the action area 18 if the membrane 12 is annular). The device 10 thus generates a series of suctions on the action area 18, i.e. on the user's skin.

Figure 3:
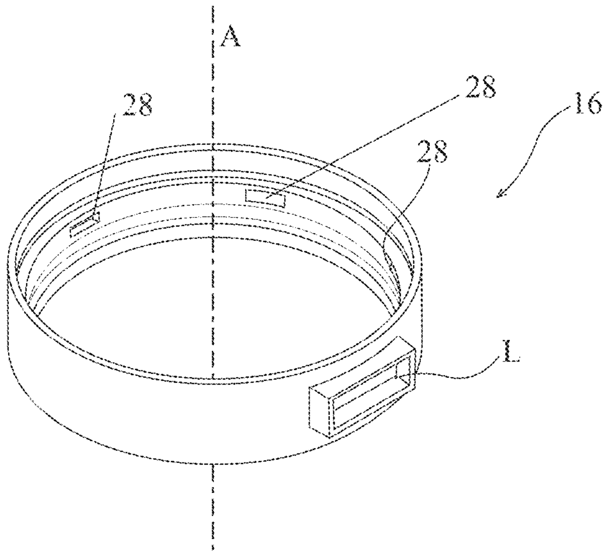
FIG. 3 is a perspective view of a vibrator ring according to the invention.

It can be seen from FIG. 3 that the vibrator ring 16 furthermore comprises at least one vibration spot 28, more precisely between three and six vibration spots 28. Each vibration spot 28 may take the form of a small electric motor with an eccentric balance inserted into a recess in an inner wall of the vibrator ring 16. Each vibration spot 28 generates 40 to 50 vibrations per second. The vibration spots 28 operate either simultaneously or alternately, according to the pre-set vibration pattern. The movements thus generated by the vibrator ring 16 are transmitted via the positioning membrane 12 to the action area 18 and can propagate beyond. The vibrations of the vibrator ring 16 generate waves that penetrate deep into the skin, allowing it to regain its preoperative suppleness and elasticity. These deep-acting movements also improve the blood circulation of the scar tissue. This stimulation of the blood circulation accelerates the supply of 02 to the tissues and helps to speed up their regeneration.

The suction device 14, each vibration spot 28 of the vibrator ring 16 and the release valves 26, 27 are controlled by an operating element 30. In the embodiment illustrated in FIGS. 1 and 4*a*, 4*b* and 4*c*, this operating element 30 is positioned at the top of the suction device 14, thus forming the top of the device 10. In other embodiments, the operating element 30 may be integral with the suction device 14, and the operating element 30 and the suction device 14 then form a single, multi-functional part. In the embodiment shown in FIG. 2*a*, the operating element 30 can be removed, allowing the user to check with the naked eye whether everything is OK or whether the device 10 is correctly located, for example.

In alternative embodiments, the operating element 30 may be integrated with the vibrator ring 16. In another embodiment, the operating element 30 may also take the form of a remote-control operating, for example, via Bluetooth. In some embodiments, the operating element 30 may comprise the battery B1.

The operating element 30 implements each pre-set vibration pattern. Thus, as seen in FIGS. 2*a* and 5, the device 10 forms a decompression cone which, when switched on, generates, simultaneously, one or more suction(s) and a series of vibrations at the action area 18.

The operating element 30 has a series of control buttons 31 for:

- turning the device 10 on or off,
- programming the vibrator ring 16 motherboard, or initiate a pre-set vibration pattern,
- setting or change the suction force,
- activating, in case of emergency, one of the release valves 26, 27.

Figure 4A:
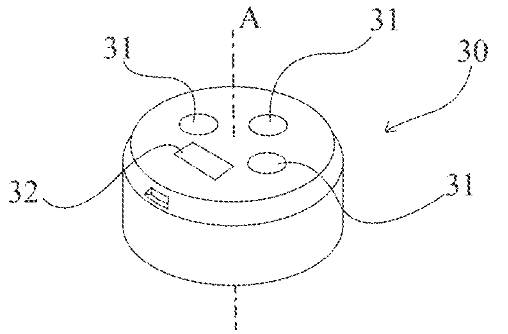
FIG. 4*a* is a perspective view of a control element according to the embodiment of FIG. 1.
Figure 4B:
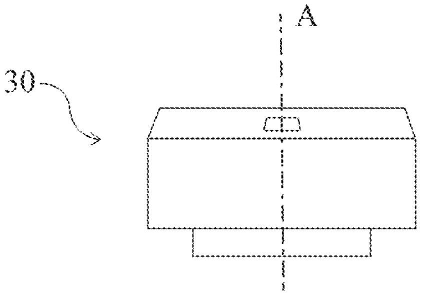
FIG. 4*b* is a side view of the control element of FIG. 4*a*.
Figure 4C:
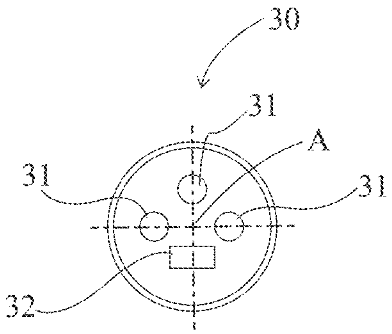
FIG. 4*c* is a top view of the control element of FIG. 4*a*.

The operating element 30 may also, as seen in FIGS. 4*a* and 4*c*, have a communication interface 32, which allows for the indication of essential quantities and values of the current action.

In an embodiment not shown, the operating element 30 is an application directly installed on the user's mobile phone. The device 10 can thus be conveniently controlled by the mobile phone, making its use easier, more domestic and more familiar.

It should be kept in mind that the skin of the action area 18 is often very damaged, not only by the mastectomy but also by repeated chemotherapy or radiotherapy. Thus, to further promote healing and regeneration of the skin of the action area 18, it can be seen in FIG. 2*a-b* that the device 10 has at least one red light emitting diode (LED) 34 configured to illuminate the action area 18. More specifically, the device 10 has, on an inner wall of the decompression chamber 20, a series of small red LEDs 34. These small red LEDs 34 may also be positioned on the inner wall of the vibrator ring 16. In other embodiments, the series of small red LEDs 34 is located on the control element 30, in the case where the latter is attached to the top of the main suction device 14. These small red LEDs 34 emit light with a wavelength between 620-800 nanometres. They are also controlled by the control element 30 and thus allow the action area 18 to be illuminated in a controlled manner so that light therapy can be practised simultaneously with vibration and suction. It is recommended that the red light be used for 5 to 15 minutes a day, once or twice a week.

It is well known that light therapy uses the light spectrum to stimulate and rebalance the body's cells. To do this, it uses different colours which will intervene according to the problems to be treated. In particular, red light therapy has regenerative and healing properties. It is therefore commonly used to repair tissues and help healing. In addition, several studies have shown the ability of red light to relieve pain and reduce oxidative stress. Indeed, red light stimulates the mitochondria of cells to function more efficiently, accelerating their ability to produce healing anti-inflammatories and protective antioxidants. In addition, red light appears to have properties that stimulate the skin's natural collagen production, which would tend to increase its elasticity.

Thus, the device 10 has a regenerative action on the skin (by the double action of light therapy and vibrations) as well as a preparatory action for a breast reconstruction (by aspiration).

Functioning (Operation)

The operation of the device 10 will now be described.

The implementation (or operation) of the device 10 takes place, in the following order stated, according to the following steps:

- tightly assembling the device 10 along the axis A,
- positioning of the assembled device 10 in a sealed manner along the axis A against the skin of an action area 18 of a user
- turning on the device 10 by the user,
- programming and storing a vibration pattern in the motherboard by means of the control element 30, or selecting a vibration pattern pre-stored in the motherboard,
- suction of the action area 18 by one of the two suction devices 14, 22, and simultaneously,
- vibration of the action area 18 by each vibration point 28 of the vibrator ring 16, according to the pre-established vibration pattern, according to:
  - either a defined number of cycles,
  - or an indefinite duration left to the user's discretion.

Each suction of either of the suction devices 14, 22, thus generates a suction movement from the action area 18 towards the interior of the device 10 in order to stretch it. This suction movement may be applied through the positioning membrane 12 if the positioning membrane 12 is disc-shaped or applied directly to the action area 18 if the positioning membrane 12 is annular. Each vibration further generates the propagation of movement waves in the skin of the action area 18, so as to metabolically stimulate it, as described above.

One use cycle can last up to 4 hours.

After several uses of the device 10, the user thus observes:

- a gain in elasticity and suppleness of the skin of the action area 18,
- an enlargement of the skin surface of the action area 18 by stretching it.

This enlargement of the skin surface of the action area 18 creates a space which, in time, allows a fatty tissue graft to be received. The process can be repeated until a reconstructed breast of the desired size is obtained. No rejection is possible since the fat graft is derived from the user's own fat tissue.

The present invention thus offers a simple, durable and non-invasive breast reconstruction. Due to its small size and the presence of a rechargeable battery, the device 10 can be used anywhere, at any time, without major inconvenience.

NUMERICAL REFERENCES

10—skin massage device
12—positioning membrane
14—main suction device
15—annular seal
16—vibrator ring
17—ring snap mechanism
18—action area
20—decompression chamber
22—auxiliary suction device
24—fluidic conduit
26—release valve
27—auxiliary release valve
28—vibration spot
30—operating element
31—control knob
32—communication interface
34—red light-emitting diode
B1—rechargeable battery
B2—means of connection to the mains

The invention claimed is:

1. A skin massage device configured to be positioned in contact with a person's skin, the device comprising:
- a positioning membrane configured to:
  - delimit an action area of the person, and
  - generate a sealed contact between said action area and the device,
- a main suction device controlled by an operating element,
- a vibrator ring configured to produce a series of vibrations according to a pre-set pattern, the vibrator ring also being controlled by the operating element,
- the positioning membrane, the main suction device and the vibrator ring each presenting a rotational symmetry according to an axis A,
- the vibrator ring being secured in a detachable and sealed way between the positioning membrane and the main suction device, so that the skin massage device presents a general rotational symmetry around the axis A, and
- wherein the skin massage device forms a decompression cone which, when switched on, simultaneously generates a suction and a series of vibrations in the action area.

2. The skin massage device according to claim 1, wherein the skin massage device comprises at least one red electroluminescent diode configured to illuminate the action area.

3. The skin massage device according to claim 1, wherein the operating element is an app intended for being installed on a mobile phone.

4. The skin massage device according to claim 1, wherein the skin massage device comprises an auxiliary suction device, which is detachably connected to the main suction device by a fluidic line.

5. The skin massage device according to claim 4, wherein each of the main suction device and the auxiliary suction device displays three different suction forces.

6. The skin massage device according to claim 4, wherein each of the main suction device and the auxiliary suction device has a low suction force comprised between 90 and 100 mmHg, a medium suction force comprised between 160 and 170 mmHg, and a high suction force comprised between 240 and 250 mmHg.

7. The skin massage device according to claim 4, wherein each of the main suction device and the auxiliary suction device has a discontinuous functioning, producing a series of 40 to 60 suctions per minute.

8. The skin massage device according to claim 1, wherein the vibrator ring is configured to receive a motherboard for recording the pre-set vibration pattern.

9. The skin massage device according to claim 1, wherein the vibrator ring comprises at least one vibration spot, each vibration spot of the at least one vibration spot generating 40 to 50 vibrations per second.

10. A skin stretching method, using the skin massage device according to claim 1, comprising, in the following order, the following steps:

positioning the skin massage device assembled in a sealed manner along the axis A against the skin of the action area of the person, switching on the skin massage device, programming and storing, by the person, a vibration pattern in a motherboard by way of the operating element, or selection by the person of a vibration pattern pre-stored in the motherboard, suction of the action area by the main suction device or an auxiliary suction device and simultaneously vibrating the action area by the vibrator ring according to:

either a defined number of cycles, or an indeterminate duration left to the discretion of the person, the suction generating a suction movement of the action area towards an interior of the skin massage device so as to stretch the action area, each vibration generating a propagation of movement waves in the action area, so as to stimulate the action area metabolically, the method making it possible to observe, after several uses of the skin massage device:

a gain in elasticity and flexibility of the action area, and an enlargement of the action area by stretching the action area, so as to create a pocket suitable for receiving a graft or an implant.

* * * * *